Patented Oct. 8, 1935

2,016,944

UNITED STATES PATENT OFFICE 2,016,944

WATER-INSOLUBLE AZO DYES AND PROCESS OF MAKING THEM

Heinrich Ohlendorf, Dessau in Anhalt, Germany, assignor to General Aniline Works, Inc., New York, N. Y., a corporation of Delaware No Drawing. Application December 4, 1934, Serial No. 755,879. In Germany December 19, 1933

10 Claims. (Cl. 260—90)

My present invention relates to new azo dyes which correspond to the general formula

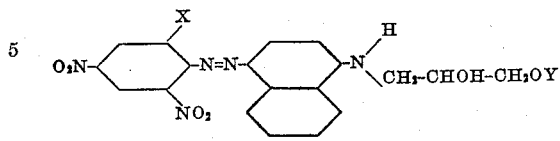

wherein X means chlorine or bromine and Y stands for hydrogen or alkyl. In this formula the naphthalene nucleus may contain halogen as further substituent.

Another object of the invention is the process for manufacturing these new dyes.

My new products are especially suited for dyeing cellulose esters, particularly acetate silk, pure blue tints; they have particular advantages in the white discharge method. A further advantage resides in their fastness to the action of acids.

The dyes of the kind described are insoluble in water and are applied for dyeing artificial silk in the manner usual for such dyes, namely, in aqueous suspension with or without the addition of a colloid or a solvent.

The following examples illustrate the invention, the parts being by weight:—

Example 1.—20.9 parts of 6-bromo-2,4-dinitro-1-aminobenzene are introduced, while stirring, at about 50 to 60° C. into nitrosyl sulfuric acid obtained from 7 parts of sodium nitrite and 120 parts of sulfuric acid of 66° Bé. strength. Then the mixture is poured on ice and thus diluted. The solution containing the diazo compound as sulfuric acid salt is allowed to run, if necessary after filtration, into a cold solution of 22 parts of 1(β,γ-di-hydroxypropylamino)-naphthalene of the formula

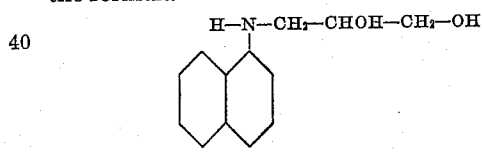

Sodium acetate is added for neutralizing the sulfuric acid until coupling is finished. The dye thus obtained may be dispersed in the usual manner and applied for dyeing acetate silk fast clear blue tints according to the methods usual in the case of suspended dyes, for example, in soap suspension baths.

Example 2.—29 parts of 6-bromo-2,4-dinitro-1-aminobenzene are diazotized in the manner described in Example 1 and coupled with 23 parts of 1(γ-methoxy-β-hydroxy-propylamino)-naphthalene of the formula

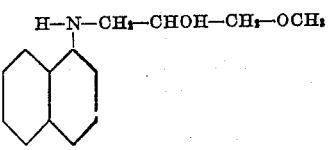

The dye thus obtained is filtered with suction and brought into paste form or dried with or without the addition of a dispersing agent, a protective colloid or the like. Acetate silk is dyed similar blue tints as with the dye obtainable according to Example 1.

Example 3.—When substituting in Example 2 for the 1(γ-methoxy-β-hydroxypropylamino)-naphthalene 24.5 parts of the corresponding γ-ethoxy compound a dye is obtained dyeing acetate silk clear reddish blue tints.

Example 4.—29 parts of 6-bromo-2,4-dinitro-1-aminobenzene are diazotized and coupled with 27 parts of 8-chloro-1-(γ-methoxy-β-hydroxypropylamino)-naphthalene. The dye is recovered in the usual manner. It dyes acetate silk clear blue tints of good fastness.

It is obvious that my invention is not limited to the foregoing examples nor to the specific details given therein. Thus, for instance, in the examples the 6-bromo-2,4-dinitro-1-aminobenzene may be substituted by the equivalent quantity of 6-chloro-2,4-dinitro-1-aminobenzene, whereby dyes are obtainable which generally show the same qualities as the corresponding brominated dyes.

What I claim is:—

1. The dyes corresponding to the general formula

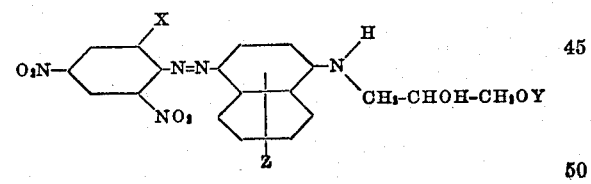

wherein X means chlorine or bromine, Y stands for hydrogen or alkyl, and Z means hydrogen or halogen, these dyes being insoluble in water and dyeing acetate silk clear blue tints which are remarkably fast to light, acids, washing, water, and perspiration, and which are white dischargeable.

2. The dyes corresponding to the general formula

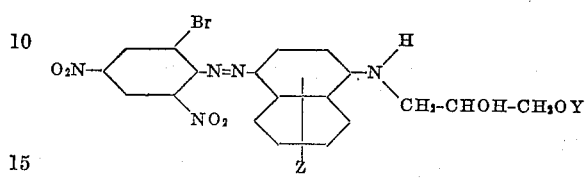

wherein Y stands for hydrogen or alkyl and Z means hydrogen or halogen, these dyes being insoluble in water and dyeing acetate silk clear blue tints which are remarkably fast to light, acids, washing, water, and perspiration, and which are white dischargeable.

3. The dye corresponding to the formula

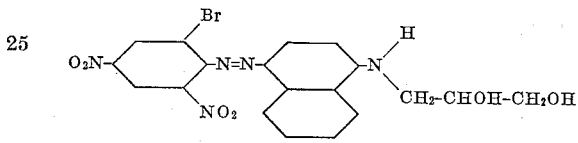

this dye being insoluble in water and dyeing acetate silk a clear blue tint which is remarkably fast to light, acids, washing, water, and perspiration, and which is white dischargeable.

4. The dye corresponding to the formula

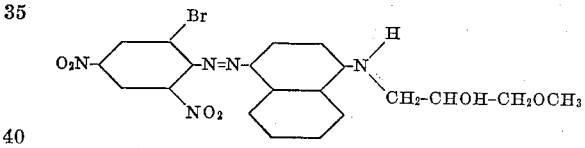

this dye being insoluble in water and dyeing acetate silk a clear blue tint which is remarkably fast to light, acids, washing, water, and perspiration, and which is white dischargeable.

5. The dye corresponding to the formula

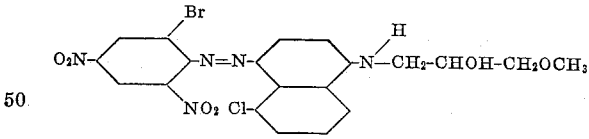

this dye being insoluble in water and dyeing acetate silk a clear blue tint which is remarkably fast to light, acids, washing, water, and perspiration, and which is white dischargeable.

6. The process which comprises diazotizing a compound of the general formula

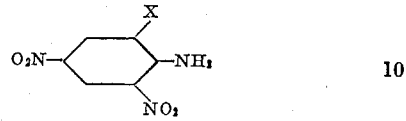

wherein X is chlorine or bromine, and coupling the diazo compound with an azo component of the general formula

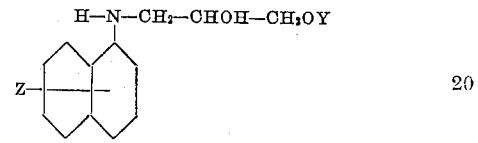

wherein Y means hydrogen or alkyl and Z stands for hydrogen or halogen.

7. The process which comprises diazotizing 6-bromo-2,4-dinitro-1-aminobenzene and coupling the diazo compound with an azo component of the general formula

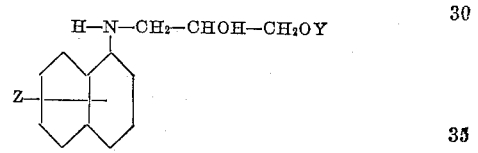

wherein Y means hydrogen or alkyl and Z stands for hydrogen or halogen.

8. The process which comprises diazotizing 6-bromo-2,4-dinitro-1-aminobenzene and coupling the diazo compound with 1(β,γ-dihydroxypropylamino)-naphthalene.

9. The process which comprises diazotizing 6-bromo-2,4-dinitro-1-aminobenzene and coupling the diazo compound with 1(γ-methoxy-β-hydroxypropylamino)-naphthalene.

10. The process which comprises diazotizing 6-bromo-2,4-dinitro-1-aminobenzene and coupling the diazo compound with 8-chloro-1-(γ-methoxy-β-hydroxypropylamino)-naphthalene.

HEINRICH OHLENDORF.